United States Patent [19]

Reid et al.

[11] Patent Number: 4,619,957

[45] Date of Patent: * Oct. 28, 1986

[54] BENZOATE-STABILIZED RIGID POLYVINYL CHLORIDE COMPOSITIONS

[75] Inventors: William J. Reid, Perth, Australia; Jean M. Zappia, Yonkers, N.Y.; Gerald A. Capocci, Greenwich, Conn.; John D. Spivack, Spring Valley, N.Y.

[73] Assignee: Ciba-Geigy Corporation, Ardsley, N.Y.

[*] Notice: The portion of the term of this patent subsequent to Nov. 26, 2002 has been disclaimed.

[21] Appl. No.: 764,282

[22] Filed: Aug. 9, 1985

Related U.S. Application Data

[63] Continuation-in-part of Ser. No. 579,232, Feb. 13, 1984, Pat. No. 4,555,541.

[51] Int. Cl.$^4$ ............................................. C08K 5/58
[52] U.S. Cl. ........................................ 524/91; 524/180; 524/291; 524/413
[58] Field of Search ............... 524/180, 413, 291, 91

[56] References Cited

U.S. PATENT DOCUMENTS 3,112,338  11/1963  Smutny et al. .................. 524/291

OTHER PUBLICATIONS

W. S. Castor et al.–*Additives for Plastics*, vol. 1, 233–248, Raymond B. Seymour, editor, Academic Press, N.Y.
Norman S. Allen et al.–Polymer Degradation and Stability 7 (1984) 153–174.
Robert S. Hallas–Plastics Engineering, May 1976, 15–19.
C. H. Kuist et al.–SPE Journal, Jul. 1976, vol. 24, 46–51.
Komar et al., Chemical Abstracts 70 (1969) 79203v.

*Primary Examiner*—Veronica P. Hoke
*Attorney, Agent, or Firm*—Harry Falber

[57] ABSTRACT

Rigid polyvinyl chloride containing reduced amounts of titanium dioxide and a tin mercaptide thermal stabilizer, said polyvinyl chloride being stabilized against the adverse effects of ultraviolet radiation by the addition thereto of effective amounts of benzoate compounds.

10 Claims, No Drawings

BENZOATE-STABILIZED RIGID POLYVINYL CHLORIDE COMPOSITIONS

RELATED APPLICATION

This application is a continuation-in-part of application Ser. No. 579,232, filed Feb. 13, 1984, now U.S. Pat. No. 4,555,541, issued Nov. 26, 1985.

Rigid polyvinyl chloride is utilized for a variety of applications including, for example, siding for houses and window frames. The rigid polyvinyl chloride is generally formulated with high levels of titanium dioxide, e.g. 12-15 parts per hundred, in order to provide proper pigmentation and prevent significant color variation upon exposure to UV radiation and with a tin mercaptide compound as a heat and process stabilizer. The combination of the titanium dioxide and the tin mercaptide permit the resin to be utilized outdoors, an essential characteristic, without undergoing excessive photodegradation. Manufacturers are thus generally assured that the siding, window frames, and the like, will be functional for substantial periods of time without significant color change or resin degradation.

There are, however, certain disadvantages to the use of such high levels of titanium dioxide. Of primary importance, the high content causes excessive wear and early failure, i.e. scoring and uneven wear of extruder barrels and screws in the polyvinyl chloride processing equipment, necessitating expensive and frequent replacement of parts. A further major shortcoming of rigid polyvinyl chloride containing these high titanium dioxide levels is that sidings prepared therefrom can only be in white or pastel colors. Darker shades of siding are not available because of the high levels. Attempts to lower the titanium dioxide level have resulted in significant reductions in light stability of the polyvinyl chloride as evidenced by unacceptable color changes, loss of impact strength and surface crazing.

It is, thus, the primary objective of this invention to provide rigid polyvinyl chloride with reduced titanium dioxide levels thereby substantially eliminating the disadvantages resulting from the use of high levels.

It is a further object to provide such material without sacrificing the beneficial properties thereof, such as effective light stability and high impact strength.

It is another object to provide such materials which exhibit a broader range of performance characteristics than the prior art materials.

Various other objectives of this invention will become apparent from a reading of the following description thereof.

It has now been determined that the titanium dioxide level of rigid polyvinyl chloride formulations can be significantly reduced while still maintaining the performance characteristics thereof. Thus, by incorporating certain selected benzoate compounds into the rigid polyvinyl chloride formulation, titanium dioxide levels can be significantly reduced to from about 2-8 parts per hundred. The resulting formulated polyvinyl chloride exhibits excellent light and heat stability, color retention and high impact strength. In addition, the lower titanium dioxide levels reduce the wear and resulting failure of the processing equipment while giving the siding and frame manufacturers greater flexibility in the color of the manufactured item, i.e. availability of darker colors.

The benzoates applicable for use in the instant invention correspond to the formula

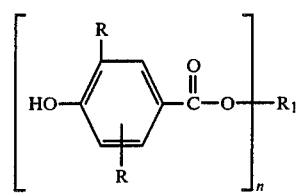

wherein
R is alkyl;
$R_1$ is alkylenetriyl, alkylenetetrayl, alkylenepentayl and alkylenehexayl; and
n is 3-6.

R is preferably alkyl of 1 to 8 carbon atoms. Particularly preferable is when both R groups on the ring are $C_4$-$C_8$ branched alkyl such as when R is tert.butyl, tert.amyl or tert.octyl and when both R groups are in the ortho position to the hydroxyl or in the meta-position to the carbonyl group.

$R_1$ is straight chain or branched with preferably 3-20 carbon atoms, provided that the valence of $R_1$ is equal to n. Preferred are propane 1,2,3-triyl; ethane-2,2,2-triethylenetriyl; propane-3,3,3-trimethylenetriyl; butane-4,4,4-trimethylenetriyl; neopentyltetrayl; and hexamethylene-1,2,3,4,5,6-hexayl.

The indicated benzoates, processes for their preparation and their light stabilization effectiveness primarily in polyolefins are noted in a number of patents, e.g. U.S. Pat. No. 3,112,338 and U.S. Pat. No. 3,206,431. Sugar alcohols useful in making benzoate esters may be derived from a variety of mono- and di-saccharides, including mannitol and sorbitol. Typical compounds include trimethylolethane-tris(3,5-di-t.butyl-4-hydroxybenzoate); glycerol-tris(3,5-di-t.butyl-4-hydroxybenzoate); pentaerythritoltetrakis(3,5-di-t.butyl-4-hydroxybenzoate); and d,l-mannitol-hexakis(3,5-di-t.butyl-4-hydroxybenzoate).

Combinations of these benzoates with either benzotriazoles, hindered phenols or mixtures thereof also provide effective stabilization in the presence of the low titanium dioxide levels. Typical benzotriazoles include 2-(2'-hydroxyphenyl)-benzotriazoles, for example, the 5'-methyl-, 3',5'-di-tert.butyl-, 5'-tert.butyl-, 5'-(1,1,3,3-tetramethylbutyl)-, 5-chloro-3',5'-di-tert.butyl-, 5-chloro-3'-tert.butyl-5'-methyl-, 3'-sec.butyl-5'-tert.butyl-, 4'-octyloxy-, 3',5'-di-tert.amyl-, 3',5'-bis-(alpha,alpha-dimethylbenzyl)-derivatives. Typical hindered phenols include alkylated monophenols, alkylidene bisphenols, esters of $\beta$-(3,5-di-tert-butyl-4-hydroxyphenyl) acetic and propionic acids, corresponding 3-methyl-5-di-tert.butyl compounds, the corresponding amides, and the like.

The benzoates are utilized in concentrations ranging from 0.2 to 4.0%, by weight of resin, and preferably 0.5 to 2.0%. A maximum of about 50% of the benzoate concentration can be replaced when utilizing these optional additives in combination therewith, with the benzotriazole being able to replace a maximum of about 50% and the hindered phenol being able to replace a maximum of 25% whether utilized individually or in combination.

The titanium dioxides that are conventionally utilized in rigid polyvinyl chloride formulations are known and commercially available. The preferred titanium dioxides are rutile grades. For purposes of this invention, 2.0–8.0% of titanium dioxide, per weight of resin is applicable with 4.0 to 6.0% being preferred. These concentrations provide the necessary photodegradative inhibition when combined with the benzoates while substantially eliminating the aforementioned disadvantages of high titanium dioxide levels.

The instant invention relates to the stabilization of rigid polyvinyl chloride, i.e. unplasticized polyvinyl chloride resin as well as materials containing at least about 85% of polyvinyl chloride resin. Such resins generally contain additives including processing aids, impact modifiers, lubricants, pigments, fillers, and the like. They also contain thermal stabilizers. For purposes of this invention such thermal stabilizers are organotin mercaptides which are commercially available and well known to those skilled in the art. Such mercaptides correspond to the general formula $(R'S)_y Sn(R'')_{4-y}$ wherein $R'$ and $R''$ are individually selected from alkyl, cycloalkyl, aryl, alkaryl or aralkyl radicals among others and y is 1–3. A wide variety of tin mercaptides are disclosed in U.S. Pat. No. 2,641,588, U.S. Pat. No. 2,726,227, U.S. Pat. No. 3,933,741 and U.S. Pat. No. 3,953,385. The disclosures in these patents relative to the tin mercaptides are deemed to be fully encompassed herein. Such stabilizers are generally present in concentrations ranging from 1.0 to 4.0%, by weight of resin. It is to be noted that the thermal stabilization effectiveness of these mercaptides is not sacrificed by the presence of the benzoate and the reduction in the titanium dioxide level. Techniques for processing rigid polyvinyl chloride are also known to those skilled in the art and such techniques are applicable herein. Compounding followed by extrusion is the conventional technique for siding manufacture.

As previously noted, the stabilized rigid polyvinyl chlorides of this invention exhibit a broad range of desirable properties. Of particular value, they permit the reduction of titanium dioxide levels without sacrificing the light stability and impact strength provided by the high levels. In addition, the lowering of the titanium dioxide content allows for significantly reduced wear on the processing machinery and for an expansion of the number of pigmented systems that can be readily utilized therein. Thus, while the high titanium dioxide levels restrict the available colors to white and pastels, the instant systems are available in a broad range of light, pastel and dark colors.

The following examples illustrate the preferred embodiments of the invention. In these examples, all parts given are by weight unless otherwise specified.

EXAMPLE 1

This example illustrates the preparation of a typical benzoate of this invention.

D,L-MANNITOL-HEXAKIS-(3,5-DI-TERT.BUTYL-4-HYDROXYBENZOATE)

57.3 grams of 3,5-di-tert.butyl-4-hydroxybenzoyl chloride (90% pure, 0.192 moles) is added over 20 minutes at 20° C. to a fine dispersion of d,l-mannitol in 400 ml of pyridine. The reaction mixture is stirred at 65° to 70° C. for 20 hours. The precipitated pyridine hydrochloride was filtered and washed with toluene. The combined filtrate was distilled at 20° to 35° C. at 15 mm Hg, the residue was dissolved in 300 ml of toluene and additional pyridine hydrochloride removed by filtration. The filtrate was made alkaline with 2N aqueous sodium hydroxide, washed with saturated sodium chloride, the organic phase being dried over anhydrous sodium sulfide and magnesium sulfate. The residue from the dried filtrate was recovered by distillation of the solvent in vacuo and purified by high pressure liquid chromatography by elution through a silica gel column with a solvent medium of 77% by volume of n-heptane and 23% by volume of ethyl acetate.

The d,l mannitol-hexakis(3,5-di-tert.butyl-4-hydroxybenzoate) was isolated as an off-white powder melting at 183°–190° C.

| Analysis | % C | % H |
| --- | --- | --- |
| Calculated | 73.2 | 8.6 |
| Found | 73.8 | 8.6 |

EXAMPLE 2

The following rigid polyvinyl chloride formulation was utilized in the example.

| | Parts |
| --- | --- |
| polyvinyl chloride resin[1] | 100 |
| methacrylic acid/ester processing aid[2] | 2.0 |
| acrylic impact modifier[3] | 7.0 |
| calcium stearate | 0.8 |
| paraffin wax | 1.0 |
| polyethylene wax | 0.2 |
| tin mercaptide[4] | 2.0 |
| titanium dioxide (rutile, non-chalking) | variable |
| light stabilizer | variable |

[1]GEON 103EP-76 from B. F. Goodrich Co.
[2]ACRYLOID K120N from Rohm & Haas
[3]ACRYLOID K330 from Rohm & Haas
[4]THERMOLITE T137 from M & T Chemicals The ingredients are blended including the indicated amounts of $TiO_2$ and stabilizer. The samples are milled on a two roll mill (front roll @171° C.—back roll @165° C.) for a period of three minutes after band formation. The resulting material is then compression molded (temperature 182° C., 2 minutes no pressure, 1 minute pumping pressure, 2 minutes full pressure, cool to 38° C.) into test plaques (5.1 cm.×5.1 cm.)

The following compounds were utilized in these examples.

A. trimethylolethane-tris(3,5-di-t.butyl-4-hydroxybenzoate)
B. glycerol-tris(3,5-di-t.butyl-4-hydroxybenzoate)
C. pentaerythritol-tetrakis(3,5-di-t.butyl-4-hydroxybenzoate)
D. d,l-mannitol-hexakis(3,5-di-t.butyl-4-hydroxybenzoate)
E. sorbitol-hexakis(3,5-di-t.butyl-4-hydroxybenzoate)

The formulated samples were submitted to the following test procedures:

Test I—Dry Xenon Weatherometer Exposure

Exposed in Xenon Weatherometer at black panel temperature of 55°–60° C. and relative humidity of 70–75%. Samples are withdrawn at periodic intervals and yellowness index measured according to ASTM D-1925-63T. Higher values are indicative of lower stability. "Failure" reflects a yellowness index greater than 40.

Test II—Spray Xenon Weatherometer Exposure

Exposed as in Test I with identical black panel temperature and relative humidity, 102 minutes of dry cycle and 18 minutes of water spray cycle. Measured by yellowness index.

The results obtained in these tests are noted below

TABLE I

|   | Conc. Stab. (phr) | Conc. TiO$_2$ (phr) | Yellowness Index 0 hrs. | 600 hrs. |
|---|---|---|---|---|
|   | — | 5 | 7.4 | 8.1 |
| D | 1 | 5 | 5.9 | 4.3 |

TABLE II

|   |   |   | 0 hrs. | 3800 hrs. |
|---|---|---|---|---|
|   | — | 5 | 6 | 11 |
| A | 1 | 5 | 7 | 9 |

*Test I
**Test II

Compounds B, C and E can be expected to show similar activity as the above noted compounds when subjected to similar test procedures.

These data clearly indicate that the rigid polyvinyl chloride formulations of this invention exhibit effective light stabilization even at reduced TiO$_2$ levels.

In summary, this invention provides regid polyvinyl chloride compositions which exhibit a broad range of excellent performance characteristics. Variations may be made in procedures, propoetions and materials without departing from the scope of the invention as defined by the following claims.

What is claimed is:

1. A rigid polyvinyl chloride composition comprising, in addition to said polyvinyl chloride, 2 to 8% titanium dioxide, by weight of the polyvinyl chloride, an effective thermal stabilizing amount of a tin mercaptide and an effective amount for the purpose of ultraviolet light stabilization of a benzoate compound of the formula

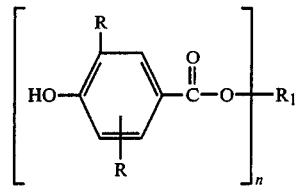

wherein

R is alkyl;

R$_1$ is alkylenetriyl, alkylenetetrayl, alkylenepentayl and alkylenehexayl; and n is 3–6.

2. The composition of claim 1, wherein both R groups are tertiary butyl and are in ortho position to the hydroxyl group.

3. The composition of claim 1, wherein R$_1$ contains 3–20 carbon atoms and has a valence equal to n.

4. The composition of claim 1, wherein said benzoate is trimethylolethane-tris(3,5-di-t.butyl-4-hydroxybenzoate.

5. The composition of claim 1, wherein said benzoate is glycerol-tris(3,5-di-t.butyl-4-hydroxybenzoate).

6. The composition of claim 1, wherein said benzoate is pentaerythritol-tetrakis(3,5-di-t.butyl-4-hydroxybenzoate).

7. The composition of claim 1, wherein said benzoate is d,l-mannitol-hexakis(3,5-di-t.butyl-4-hydroxybenzoate).

8. The composition of claim 1, wherein said benzoate is sorbitol-hexakis(3,5-di-t.butyl-4-hydroxybenzoate).

9. The composition of claim 1 which contains 0.2 to 4.0% of benzoate, by weight of polyvinyl chloride.

10. The composition of claim 1 which additionally contains a benzotriazole, a hindered phenol or mixtures thereof; said benzotriazole replacing a maximum of 50% of said benzoate and said phenol replacing a maximum of 25% of said phenol with the total replacement by both additives not exceeding 50% of said benzoate.

* * * * *